United States Patent
Bil et al.

[15] 3,642,423
[45] Feb. 15, 1972

[54] DYEING HUMAN HAIR WITH HYDROXYALKYL NITROANILINE DYES

[72] Inventors: Milos S. Bil, Forest Hills, N.Y.; Walter H. Brunner, Easton, Pa.

[73] Assignee: Clairol Incorporated, New York, N.Y.

[22] Filed: Mar. 21, 1966

[21] Appl. No.: 535,687

Related U.S. Application Data

[63] Continuation-in-part of Ser. No. 527,405, Dec. 29, 1965, abandoned.

[52] U.S. Cl. ................................8/10.1, 8/10, 8/10.2, 8/11, 8/54, 8/54.2, 8/92, 8/93, 8/177, 8/178, 8/179, 260/573
[51] Int. Cl. ..................................................A61k 7/12
[58] Field of Search ..............167/88; 8/10, 10.1; 260/573

[56] References Cited

UNITED STATES PATENTS

| | | | |
|---|---|---|---|
| 1,980,536 | 11/1934 | Lange | 260/573 |
| 2,019,626 | 11/1935 | Olpin et al. | 260/573 X |
| 2,338,380 | 1/1944 | Hester et al. | 260/573 X |
| 2,434,564 | 1/1948 | Hester et al. | 260/573 X |
| 3,274,249 | 9/1966 | Brunner et al. | 167/88 X |
| 2,550,326 | 6/1956 | Eckhardt | 167/88 |

FOREIGN PATENTS OR APPLICATIONS

| | | | |
|---|---|---|---|
| 762,846 | 1/1934 | France | 260/573 |
| 781,430 | 2/1935 | France | 260/573 |
| 634,249 | 8/1936 | Germany | 260/573 |

OTHER PUBLICATIONS

Kass et al., Journal of the Society of Cosmetics Chemists, Vol. 12, No. 3, pp. 146-150, April 1961.

Primary Examiner—Albert T. Meyers
Assistant Examiner—Vera C. Clarke
Attorney—William F. Moss, David J. Mugford, Irving Holtzman, George A. Mentis, Ralph D. Gelling and Marvin B. Rosenberg

[57] ABSTRACT

An aqueous dyeing composition particularly suitable for dyeing hair having incorporated therein a tinctorially effective amount of a hydroxyalkyl nitroaniline dye of the formula:

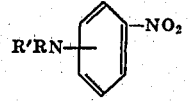

wherein R is hydrogen, lower alkyl or hydroxyalkyl and R' is hydroxyalkyl.

8 Claims, No Drawings

DYEING HUMAN HAIR WITH HYDROXYALKYL NITROANILINE DYES

This application is a continuation-in-part of an application filed by Milos S. Bil and Walter H. Brunner on Dec. 29, 1965, Ser. No. 527,405 now abandoned. This invention relates to methods of dyeing synthetic and natural fibers, particularly human hair, with a class of hydroxyalkyl nitroaniline dyes and to compositions containing the same which are useful for this purpose. It also concerns novel methods for preparing the hydroxyalkyl nitroaniline dyes that are employed in this invention.

The class of hydroxyalkyl nitroaniline dyes that have been found to be applicable to the present invention are described by the formula:

(1) 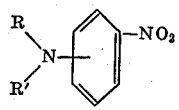

wherein R is hydrogen, lower alkyl or hydroxyalkyl and R' is hydroxyalkyl. R and R' can be the same hydroxyalkyl radical or they may represent different hydroxyalkyl radicals. When R is lower alkyl, it may have one to four carbon atoms, e.g., methyl, ethyl, isopropyl, propyl, butyl. In the preferred form of this invention the hydroxyalkyl radical has from one to four carbon atoms and one, two or three hydroxy groups. Moreover, the ortho and para compounds are preferred.

When R or R' is hydroxyalkyl, it can be any of a variety of straight-chain or branched-chain radicals. By way of illustration the following hydroxyalkyl radicals may be mentioned: 2-hydroxyethyl, 2-hydroxypropyl, 3-hydroxypropyl; 2,3-dihydroxypropyl, 4-hydroxybutyl; 2-methyl-1,3-dihydroxy-2-propyl; tris(hydroxymethyl) methyl.

The dye compositions of the present invention can be employed as basic, neutral or acidic dye compositions and because of their stability, may be used in oxidation dye compositions. Furthermore, they may likewise be included in hair-dyeing compositions which contain other direct dyeing dyes that also may or may not contain an oxidation dye. A variety of direct dyeing dyes are known in the prior art which are useful for this purpose.

The pH of the dye compositions of this invention can vary widely, e.g., from about 2.5 to 11 and preferably from 3.5 to 10. When the dyeing is in the alkaline range, any selected water-dispersible, compatible, alkalizing agent can be used to give the desired pH. The quantity of the alkalizing agent employed can vary over a wide range depending on the dye and particular alkalizing agent employed and the desired pH. Illustratively, the alkalizing agent can vary from less than about 0.1 percent to about 10 percent, and preferably from about 0.25 percent to about 5 percent by weight of the composition.

The alkalizing agent is selected so that it will not interfere (i.e., is compatible) with the dye employed, and will not precipitate the dye. When used to dye human hair on the head, the alkalizing agent must not be toxic under the conditions of use, nor injure the scalp at its ultimate concentration in the composition to be applied. A preliminary test of some selected alkalizing agent can be made to note its compatibility with the dye or to discover possibility of toxicity or injury.

In dyeing human hair ammonium hydroxide, because of its freedom from toxicity over a wide concentration range and its economy, is an acceptable alkalizing agent. However, there can be used in place of, or together with ammonia, any other compatible ammonia derivative as an alkalizing agent, such as an alkylamine, such as ethylamine, dipropylamine, or triethylamine, an alkanediamine, such as 1,3-diaminopropane, an alkanolamine, such as ethanolamine or diethanolamine, a polyalkylenepolyamine, such as diethylenetriamine, or a heterocyclic amine, such as morpholine.

Also, as alkalizing agent, any alkaline earth hydroxide, for example, calcium hydroxide or magnesium hydroxide, can be used up to the limit of its water solubility and at any concentration that fails to produce a precipitate with any of the components of the composition. The dissolved alkaline earth hydroxides are preferred over the alkali-metal hydroxides, such as sodium hydroxide or potassium hydroxide, or carbonates, such as sodium carbonate and bicarbonate. Any of these can also be used in dyeing human hair so long as their ultimate concentration in the final dyeing solution is below that which might possibly irritate the scalp.

The alkalizing component of choice, however, especially in connection with dyeing human hair, is a water-soluble organic amine of low volatility (b.p. higher than about 50° C.) having less than about 12 carbon atoms, such as n-propylamine, isobutylamine, 2-ethylbutylamine, diethylamine, triethylamine. Particularly suited as alkalizing agents are the following: (a) primary aliphatic diamines, such as ethylenediamine; 1,2-diaminopropane; 1,3-diaminopropane; diethylenetriamine; triethylenetetramine; 2,2'-iminodipropylamine; 3,3'-iminodipropylamine; and bis-hexamethylene-triamine; (b) alkanolamines, such as ethanolamine; isopropanolamine; diethanolamine; di-isopropanolamine; triethanolamine; tri-isopropanolamine; N-methyldiethanolamine; di-isopropylethanolamine; dimethylisopropanolamine; 2-amino-2-methylpropane-1,3-diol; tris(hydroxymethyl) methylamine and the like, which may also have a phenyl substituent, e.g., N-(2-hydroxyethyl)aniline; N-methyl-N-(2-hydroxyethyl)aniline; N,N-bis(2-hydroxyethyl)aniline; and (c) heterocyclic amines, such as morpholine, N-methylmorpholine, N-ethylmorpholine, N-hydroxyethylmorpholine, N-phenylmorpholine, piperidine, N-hydroxyethylpiperdine, and piperazine.

The pH of the composition may be adjusted with any inorganic or organic acid or acid salt which is compatible with the composition. Illustrative of acids or acid salts there can be mentioned: sulfuric, formic, acetic, lactic, citric or tartaric acid, or ammonium sulfate, sodium dihydrogen phosphate, or potassium bisulfate.

Water-soluble surface active agents can also be employed in the dyeing compositions utilized in this invention. These can be anionic, nonionic or cationic. Illustrative of the various types of water-soluble surface active agents there can be mentioned: higher alkylbenzenesulfonates; alkylnaphthalenesulfonates; sulfonated esters of alcohols and polybasic acids; taurates; fatty alcohol sulfates; sulfates of branched-chain or secondary alcohols; alkyl dimethylbenzyl ammonium chlorides; and the like. Illustrative of specific surfactants there can be mentioned: lauryl sulfate; polyoxyethylene lauryl ester; myristyl sulfate; glyceryl monostearate; sodium salt of palmitic methyl taurine; cetyl pyridinium chloride; lauryl sulfonate; myristyl sulfonate; lauric diethanolamine; polyoxyethylene stearate; stearyl dimethyl benzyl ammonium chloride; dodecyl benzene sodium sulfonate; nonyl naphthalene sodium sulfonate; dioctyl sodium sulfosuccinate; sodium N-methyl-N-oleoyl taurate; oleic acid ester of sodium isothionate; sodium dodecyl sulfate; the sodium salt of 3,9-diethyl tridecanol-6-sulfate and the like. The quantity of water-soluble surface active agent can vary over a wide range, such as that of from about 0.01 to 20 percent and preferably from about 0.10 to 10 percent by weight of the composition.

A thickening agent can also be incorporated in the present dyeing composition. This is particularly suitable in compositions which are to be used in dyeing hair. One or several of those commonly used in hair dyeing, such as sodium alginate or gum arabic, or cellulose derivatives, such as methylcellulose, or the sodium salt of carboxymethylcellulose, or acrylic polymers, such as polyacrylic acid sodium salt, or inorganic thickeners, such as bentonite may be used to advantage. The quantity of thickening agent can vary over a wide range, such as that of from about 0.1 to 20 percent and preferably from about 0.5 to 5 percent by weight.

The quantities of hydroxyalkyl nitroaniline dyes in the compositions of this invention can also vary over a wide range, such as that of about 0.001 percent to greater than about 5 percent. When used in dyeing human hair, the composition contains a tinctorially effective amount of dye that may vary from about 0.001 to 3 percent. The water content of the composition is ordinarily the major constituent and can also vary over a wide range dependent in large measure on the quantity of other additives. Thus, the water content can be as little as 10 percent, and preferably from about 70 to 99 percent.

The dyeing compositions of this invention are preferably aqueous compositions. The term "aqueous composition" is used herein in its usual generic sense as embracing any water-containing composition embodied in the invention. This includes true solutions of the dye in an aqueous medium, either alone or in conjunction with other materials, which are also dissolved or dispersed in the aqueous medium. The term "aqueous composition" also encompasses any mixture of dye with the aqueous medium either alone, or together with other ingredients. The dye may be colloidally dispersed in the medium or may merely be intimately mixed therein.

The term "aqueous medium" as used herein, includes any medium which contains water. Thus, the aqueous medium may be an aqueous alkaline, aqueous neutral or aqueous acid medium. Moreover, the aqueous medium may comprise water and a solvent, e.g., ethanol. The latter may be employed as a common solvent to enhance the solution of the dye or some other organic material.

The aqueous compositions of this invention may take many forms. Thus, they may be thin or thick flowable liquids, pastes, gels, etc.

Typical dyeing compositions which are particularly suitable for dyeing human hair are set forth below:

1. ALKALINE COMPOSITIONS

|  | General Range | Preferred Range |
| --- | --- | --- |
| Dye | 0.001– 5% | 0.001– 2% |
| Surface active agent | 0.01–20% | 0.10–10% |
| Alkali | 0.1 –10% | 0.25– 5% |
| Thickening agent | 0.1–20% | 0.5 –5% |
| Acid added to | pH 7–11 | pH 7.5–9.5 |
| Water to 100% | | |

Any of the dyes, surface-active agents, alkalies, thickening agents, acids and combinations thereof set forth above may be used in the proportions specified in the table immediately above.

2. ACID COMPOSITIONS

The acid compositions are similar to the above alkaline compositions, except that the alkali is omitted, and the acid is added to a pH of 2.5–7, preferred 3.5–6.5. The surfactant may be anionic, cationic or nonionic or suitable mixtures of these, and any of these mentioned above may be used. The choice of thickener is somewhat more limited, to alkylcellulosics, such as methylcellulose and inorganics. In certain cases the surfactant itself acts as a thickener.

OXIDATION DYE COMPOSITIONS

The hydroxyalkyl nitroaniline dyes utilized in this invention are generally compatible with oxidation dyes. Accordingly, they can be used in oxidation dye compositions which are particularly suitable for dyeing human hair. Utilizable compositions contain 1 to 5 percent ammonia, 2 to 3 percent hydrogen peroxide or urea peroxide; 0.005 to 2 percent oxidation dye components; 0.001 to 3 percent compound described in formula (1) above, as well as surfactants, thickeners, etc. The oxidation dye components may, for example, be p-phenylenediamine, o-phenylenediamine, m-phenylenediamine, p-toluenediamine, resorcinol, hydroquinone, p-aminophenol; 2,4-diaminoanisole; p-aminodiphenylamine, 4,4'-diaminodiphenylamine; 4-nitro-2-aminophenol, 2-nitro-p-phenylenediamine, 4-nitro-o-phenylenediamine, and other known components.

They dyeing compositions of this invention and particularly those used in dyeing human hair can be prepared by the conventional methods used in this art. Thus, they can be prepared by dissolving or suspending the dye in water in the desired concentration. Water-miscible organic solvents can be employed to facilitate solution of the dye; in this event, the dye can be dissolved first in the solvent and then diluted with water. The dispersion of the various ingredients can also be facilitated by heating the composition at temperatures varying from 40° C. to 110° C., either before dilution with water or afterwards.

The dyeing compositions of this invention can be applied to hair by the conventional techniques used in the art. Illustratively, when applied to living hair on the human head, the compositions can be applied to the hair with a brush, sponge, or other means of contact, such as dipping until the hair is properly saturated with the composition.

The reaction time or time of contact of the dyeing composition with the hair is not critical and can vary over a wide range used in the hair dyeing art, such as periods of about 5 minutes to about 2 hours, and preferably from about 5 minutes to about 60 minutes. The dyeing temperature can also vary over wide limits as is conventional in the art. Thus, the dyeing temperature can vary from about room temperature, e.g., about 20° C. to about above 60° C., and preferably from about 20° C. to about 45° C.

The dye compositions of the present invention are especially useful in dyeing human hair on the head. However, they are also useful in dyeing another synthetic or natural fibers. Thus, for example, they may be used to dye wool; synthetic polyamide fibers (nylon); polyester fibers, e.g., prepared by the condensation of terephthalic acid and ethylene glycol, as well as cellulose acetate; and acrylic fibers, prepared by the copolymerization of acrylonitrile with vinylic monomers which may be basic. In the dyeing of the compositions of the present invention on synthetic or natural fibers, the well-known dyeing methods as with the disperse dyes are used; that is, the dyeing is generally carried out in an aqueous medium at the boil, at a neutral or weakly acid or alkaline pH. In the case of terephthalic polyester fibers, it is preferable to add a carrier to the dye bath, such as o-phenylphenol or methyl salicylate. It is an advantage of the dyeing compositions of this invention that the dyes are readily soluble in water at the boil, so that no dispersing agent is necessary, though it may be used.

Any of the hydroxyalkyl nitroanilines that fall within Formula 1 above may be used in accordance with the present invention. However, by way of illustration, the following specific compounds can be mentioned: N(2-hydroxyethyl)-o-nitroaniline; N(2-hydroxypropyl)-o-nitroaniline; N(2,3-dihydroxypropyl)-o-nitroaniline; N-methyl-N-(2-hydroxyethyl)-o-nitroaniline; N-ethyl-N-(2-hydroxyethyl)o-nitroaniline; N-(2-hydroxyethyl)-m-nitroaniline; N(2,3dihydroxypropyl)-m-nitroaniline; N-methyl-N(2-hydroxypropyl)-m-nitroaniline; N,N-bis(2-hydroxyethyl)-m-nitroaniline; N-(2-hydroxyethyl)-p-nitroaniline; N-(2,3-dihydroxypropyl)-p-nitroaniline; N-(4-hydroxybutyl)-p-nitroaniline; N-(2-methyl-1,3-dihydroxy-2-propyl)-p-nitroaniline; N-(tris-hydroxymethylmethyl)-p-nitroaniline; N-methyl-N(2-hydroxyethyl)-p-nitroaniline; N-isopropyl-N(2-hydroxyethyl)-p-nitroaniline; N,N-bis (2-hydroxyethyl)-p-nitroaniline; N,N-bis(2,3-dihydroxypropyl)-p-nitroaniline.

The dyes used in the compositions of this invention can be prepared by various well-known methods. For example, a nitroaniline (e.g., o-, m-, or p-nitroaniline) can be alkylated by use of a suitable hydroxyl-bearing alkylating agent, such as an hydroxyalkyl halide (e.g., 2-chloroethanol, or 2,3-dihydroxypropyl chloride), or an epoxy compound, such as ethylene oxide, propylene oxide, glycidol, or epichlorohydrin. Either one or two of the hydroxyalkyl substituents can be introduced, depending on the amount of alkylating agent used, and the temperature and duration of reaction. Generally, an acid-binding agent will also be present, e.g., sodium hydroxide, sodium acetate, sodium carbonate, magnesium oxide, or calcium carbonate. When the second N-substituent is a common alkyl radical (i.e., R is lower alkyl in Formula 1), this can be introduced by use of the appropriate alkyl halide, sulfate or p-toluenesulfonate by methods similar to those above. The simple alkyl radical can be introduced first, and the hydroxyalkyl introduced afterwards by use of an alkylene oxide. When the dyes used are ortho or para nitroanilines, a preferred method of synthesis is by reaction of o- or p-nitrohalobenzene with an appropriate primary or secondary aliphatic amine. For example, p-nitrofluorobenzene is reacted with ethanolamine, diethanolamine, isopropanolamine, 3-amino-1,2-propanediol, 2-methylaminoethanol, 2-ethylaminoethanol, or 3-methylamino-1,2-propanediol. Similarly, o-nitrochlorobenzene, p-nitroiodobenzene, and the like, can be so reacted. The reaction can be carried out in an organic solvent, such as butanol, pyridine or toluene, or in the absence of a solvent, using an equivalent amount or an excess of the amine, sometimes in the presence of an acid binder such as sodium carbonate. The time and temperature required depend mainly on the reactivity of the nitrohalobenzene used.

It is known that these reactions with alkanolamines may be accompanied by a significant amount of side reaction in which the alkanolamine functions as a reducing agent acting upon either the nitro starting material or the nitro product, and producing therefrom azoxy and azo compounds, and primary amines, as byproducts.

These byproducts not only materially lower the yield of the desirable hydroxyalkyl nitroaniline, but are contaminants which may be difficult to remove, requiring extra purification steps, and lowering the quality of the final product.

In view of these side reactions, it is surprising that a process could be found for N(2-hydroxyethyl)-o-nitroaniline which gives this dye economically and conveniently in a very high yield and excellent quality. This process is an additional aspect of this invention.

Several procedures have been described in the prior art for the preparation of N-hydroxyethyl-o-nitroaniline. These involve the reaction of an o-nitrohalobenzene with monoethanolamine. The prior art processes, however, are only laboratory-scale processes which are not suitable for plant-size operations.

The yields obtained by these processes are generally too low to make them suitable for commercial purposes. Where the yield is sufficiently high the purity of the product is not sufficient to make possible an economical recovery of the product. In other procedures the reaction time is prolonged, and multiple recrystallizations are required. Moreover, some of these processes require expensive starting materials.

It has now been found, quite unexpectedly, that the yield of N-hydroxyethyl-o-nitroaniline can be increased to about 95 percent by reacting o-nitrochlorobenzene and monoethanolamine following the procedure outlined in more detail below. The process is highly economical, utilizing a minimum of materials and inexpensive materials. Furthermore, no solvent or catalyst is required and the product is obtained in a high state of purity so that for dyeing purposes no recrystallization or other purification step is necessary.

The beneficial results of the process of this invention, as to the preparation of N-hydroxyethyl-o-nitroaniline are believed to be attributable to a combination of factors which can be summarized as follows:

a. use of a chloronitrobenzene as the o-nitrohalobenzene reactant;

b. use of a temperature of 140°–145° C.;

c. order of addition of materials, i.e., ethanolamine is added portionwise to the halo compound;

d. use of an acid-binding agent, e.g., sodium carbonate, and particularly in amounts greater than 0.6 mole with respect to the nitrochlorobenzene reactant.

The advantage of the use of chlorinated nitrobenzene, as distinguished from the bromo or iodo derivatives, was not recognized in the prior art. The latter two are more liable to simultaneous reduction of their nitro group leading to higher yields of o-haloaniline and a decreased yield of the desired product. Moreover, this also results in a product of inferior quality as to purity. Furthermore, of the halogenated nitrobenzenes, the chloro derivative is considerably cheaper than the fluoro, bromo or iodo derivative.

It has also been found that the presence of sodium carbonate in the reaction mixture is important in avoiding side reactions and giving high yields. Although the theoretical molar ratio to bind all the HCl formed in the reaction is o-nitrochlorobenzene: $Na_2CO_3 = 1:0.5$, it is preferred that this molar ratio be 1:1. However, a ratio of 1:0.7 to 1:0.9 has been found to be satisfactory. The use of larger amounts of sodium carbonate is also satisfactory; however, it imposes some mechanical difficulties in stirring.

Another feature of this aspect of the invention is the discovery that the temperature is highly important in the ultimate yield of the product obtained. It was found that a temperature in the range of about 140° C. to 145° C. gives the optimum yield. In the prior art reaction which does not employ a solvent, a temperature of 175° C. (the b.p. of monoethanolamine) has been employed. This is detrimental to the process and lowers the yield considerably. Temperatures of 100° C. to 120° C. have been used in the prior art, generally in processes that utilized a solvent, such as pyridine or butanol, but the yields have been very low. When n-propanol is the solvent, it has been found that at a reflux temperature of about 100° C., the reaction time is greatly increased (20 hrs.) and the yield is low (71 percent). In addition the purity of the product is unsatisfactory (m.p. 70°–72° C. and containing organic chlorine 1.3 percent).

Still another feature of this aspect of the invention is the discovery that the order in which the ingredients are added to the reaction mixture is highly important in the yield and quality which is obtained. When o-nitrochlorobenzene is added to monoethanolamine heated to 140°–145° C., there is present throughout most of the addition a relatively large excess of monoethanolamine. This serves as a reducing agent to reduce some o-nitrochlorobenzene to o-chloroaniline and other reduction products. In addition, large amounts of the N-(2-hydroxyethyl)-o-nitroaniline product are reduced to N-(2-hydroxyethyl)-o-phenylenediamine. Much of the material is thus lost in side reactions and the reaction mixture yields a black tarry product.

However, the situation is different if the warmed monoethanolamine is added to a mixture containing o-nitrochlorobenzene and maintained at a temperature of between about 140°– ° C. The monoethanolamine reacts as fast as added to form nearly exclusively the desired N(2-hydroxyethyl)-o-nitroaniline and no excess monoethanolamine is available to act as a reducing agent.

The evolution of ammonia (which would indicate decomposition) is minimal. A product of high purity is obtained and nearly all of the o-nitrochlorobenzene is reacted to form the desired product.

The purity of the product was determined by melting point, elementary analysis for carbon, hydrogen and nitrogen, nd also by determining the percentage of residual organic chlorine as an indication of unreacted o-nitrochlorobenzene.

To again summarize the advantages of the present process over prior art processes the following may be mentioned:

1. minimal amount of monoethanolamine is used, i.e., only 2 moles of monoethanolamine to 1 mole of o-nitrochlorobenzene;

2. reaction time (addition and refluxing) shortened to about 2 hours;

3. no solvent used;

4. steam distillation is minimal, if needed at all to purity the product;

5. no catalyst needed;

6. final product obtained immediately in high state of purity (chlorine content under 0.2 percent m.p. 73°–75° C.) and can be used in this form for dyeing;

7. yield very high, about 95 percent based on starting o-nitrochlorobenzene;

8. process reproducible.

The following examples are further illustrative of the present invention. It is to be understood, however, that the invention is not limited thereto.

EXAMPLE 1

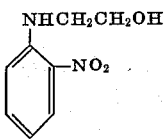

Materials
3.6 moles = 567 g. o-nitrochlorobenzene
3.6 moles = 381.6 g. sodium carbonate, anhydrous
7.2 moles = 440 g. monoethanolamine Process To the molten o-nitrochlorobenzene maintained at a temperature of between 110°–120° C. there was added the powdered $Na_2CO_3$. The mixture was heated to 140°–145° C. with vigorous stirring. Over a period of about 40 minutes the preheated monoethanolamine (90°–100° C.) was added in small portions at such a rate as to keep the inside temperature at 140°–145° C. The reaction is strongly exothermic and ammonia and carbon dioxide are evolved. The orange color of the mixture gradually turned slightly redder.

The mixture was then held at mild reflux for 90 minutes, during which time the inside temperature dropped slowly from about 142° to about 135°–137° C. The color of the mixture does not change appreciably. The mixture was then steam-distilled for removal of any unreacted o-nitrochlorobenzene, but very little of this material was present; in about 3 liters of distillate only a few drops of an oil was collected. The supernatant aqueous layer in the reaction flask was decanted and the oily layer poured in a thin stream, with good mechanical agitation, into an ice water mixture. Red-orange crystals separated immediately; the total volume amounted to about 4 liters.

The fine crystals were filtered off and washed extensively with water until the washings were neutral and showed no NaCl to be present (tested with $Ag NO_3$). The product was dried first in the air, and finally at 40°–50° C. in vacuum.

Yield was 610–620 g., i.e., 93–94 percent of the theoretical; m.p. 73°–75° C. (uncorr.); chlorine content less than 0.2 percent.

EXAMPLE 2

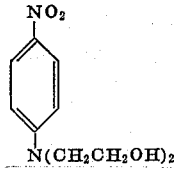

63 g. p-chloronitrobenzene (0.4 mole)
86 g. diethanolamine (0.8 mole)
0.02 g. cuprous chloride
30 g. sodium carbonate (anhydrous)

The above mixture was stirred for 8 hours at 150° C., poured into 200 ml. water, cooled and filtered. The yellow precipitate was recrystallized several times from water; m.p. 102°–103° C.

EXAMPLE 3

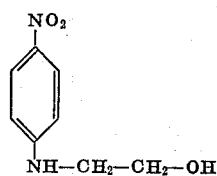

63 g. p-chloronitrobenzene (0.4 mole)
50 g. monoethanolamine (0.8 mole)
0.02 g. cuprous chloride
30 g. sodium carbonate (anhydrous)

The above mixture was stirred for 2 hours at 150° C., diluted with 100 ml. water and filtered. The yellow precipitate obtained was recrystallized from water. Golden yellow leaflets were obtained; m.p. 111° C.

The following examples illustrate the dyeing of hair with compositions containing the dyes described above. The dyeing procedures used are identified as follows

DYEING PROCEDURE A

Dyeing Hair with Alkaline Compositions (pH 7 or Higher)

A mixture was prepared using specified amounts of the following components:

| | |
|---|---|
| Dye | amount to be specified |
| Isopropanol | 0.5 ml. |
| Alkaline agent | amount to be specified |
| Surface active agent | amount to be specified |
| Thickening agent | amount to be specified |

The dye was first wet with isopropanol and the above-listed agents were added, as well as 50 ml. water. The mixture was then heated at 60° C. with stirring until a uniform dispersion was obtained. The mixture was then further diluted with water to a volume of 100 ml. and citric acid was added to give a final, specified pH of 7 or higher. The dyeing composition so obtained was poured on natural gray hair, permanet-waved hair and on bleached hair and allowed to remain in contact with the hair for 20 minutes at 30° C. Afterwards, the hair was rinsed in clear water and dried.

DYEING PROCEDURE B

Dyeing Hair with Acid Compositions (pH 7 or lower)

A mixture was prepared as follows:

| | |
|---|---|
| Dye | Amount to be specified |
| Isopropanol | 0.5 ml. |
| Surface active agent | amount to be specified |
| Thickening agent | amount to be specified |
| Water | to 100 ml. |
| Acid agent | to give specified pH of 7 or lower. |

The dye was wet with isopropanol, and the other ingredients added with stirring and warming below 50° C. to give a uniform dispersion. Hair was dyed with this compositions as in Procedure A.

PROCEDURE C

Dyeing Hair from Peroxide Bath

The following composition was prepared:

| | |
|---|---|
| Dye | 0.75 g. |
| Isopropanol | 2.5 ml. |
| Oleic acid | 35.0 g. |
| Polyethoxyethylene mono-oleate (Tween 80) | 10.0 g. |
| Isooctyl polyethoxyethanol (Triton X–100) | 3.5 g. |
| Ethylenediamine-tetraacetic acid | 0.25 |
| 28% Ammonia | 10.0 ml. |
| Water | to 100 ml. |

A 30-milliliter portion of this composition was mixed with 30 ml. of 6 percent hydrogen peroxide and the mixture poured on natural gray and bleached hair and allowed to remain there for 40 minutes at 30° C. The hair was then rinsed with clear water, shampooed and dried.

EXAMPLE 4

N-(2-Hydroxyethyl)-o-nitroaniline was dyed on hair according to Procedure A, using 0.25 g. dye, 3.0 g. N-phenyl-diethanolamine (as alkaline agent), 3.0 g. sodium N-coconut acid N-methyl taurate (as surfactant), and 3.0 g. hydroxyethylcellulose (as thickener), the pH being adjusted to 9.5.

Gray, permanent-waved and bleached hair were all dyed in strong golden yellow shades, uniformly among the three kinds of hair, and all were fast to light and rubbing. When this composition was stored for 3 months at 50° C. and again dyed on hair, the dyeings were fully equivalent to the initial dyeings in shade and strength.

When the same dye was applied according to Procedure B, using 0.25 g. dye, 1.0 g. nonylphenoxypoly(ethyleneoxy)ethanol (surfactant), 2.0 g. hydroxyethylcellulose (thickener) and citric acid to pH 3, the gray, permanent-waved and bleached hair were also dyed uniformly and strongly in yellow shades. These were stable to light and rubbing. This composition was also unaffected by storage at 50° C. for 3 months.

When the same dye was applied by Procedure C, it gave similar fairly strong golden yellow dyeing on both gray and bleached hair, showing its stability to peroxide.

EXAMPLE 5

N-(2-Hydroxyethyl)-o-nitroaniline was dyed on hair according to Procedure A, using 0.3 g. dye, 3.0 g. diethylenetriamine (alkaline agent), 4.0 g. lauric diethanolamide (surfactant) and 3.0 g. methylcellulose (thickener), the pH being adjusted to 8.5. A yellow dyeing of good strength was obtained uniformly on bleached, on gray hair and on permanent-waved hair which was fast to light and rubbing. When the above composition was stored at 50° C. for 3 months and then again dyed on hair, the dyeings were similar in shade and strength to the initial dyeings.

EXAMPLE 6

N-(2-Hydroxyethyl)-o-nitroaniline was dyed on hair according to Procedure A, using 0.15 g. dye, 4.0 g. ethanolamine (alkaline agent), 2.0 g. sodium dodecylbenzenesulfonate, and 3.0 g. sodium carboxymethylcellulose, the final pH being 8.0. Gray, permanent-waved and bleached hair were dyed similar shades of strong golden yellow having good fastness to light and rubbing. The dye composition was also stored at 50° C. for 3 months and thereafter dyed hair identically to the initial dyeing in shade and strength.

When Procedure B was used with the same dye, using 0.4 g. dye, 2.0 g. ethylene glycol monostearate, 2.0 g. methylcellulose, and lactic acid to pH 5.5, bleached hair, permanent-waved hair and gray hair were dyed strongly in yellow shades fast to light and rubbing.

EXAMPLE 7

A dye-bath was prepared by dispersing 0.1 g. N-(2-hydroxyethyl)-o-nitroaniline, with 0.025 g. of a polyoxyethylated long-chain alcohol, 1 g. o-phenylphenol and 0.4 g. diammonium phosphate in 200 ml. water. With the dye-bath at 140° F., a 5-gram piece of Dacron cloth was entered, the temperature raised to the boil over a period of one-half hour, and held at the boil for 75 minutes. The cloth was removed, soaped and rinsed. It was dyed a strong shade of reddish yellow, of good wash-fastness and moderately good light-fastness.

EXAMPLE 8

An 0.25 percent solution of N-(2-hydroxyethyl)-o-nitroaniline in water was prepared at the boil. To 200 ml. of the solution at 140° F. was added a 5-gram piece of acrylic or modified acrylic goods (namely Orlon, Acrilan or Creslan). The bath was brought to the boil in one-half hour, and held at the boil for 1 hour. When the cloth was removed, rinsed and soaped, it was dyed a reddish yellow shade of fair-to-good wash-fastness.

EXAMPLE 9

The dye N-(2-hydroxyethyl)-p-nitroaniline was dyed according to Procedure A: 0.2 g. dye was combined with 3 g. ethanolamine (alkali), 3 g. sodium N-coconut acid N-methyl taurate (surfactant) and 2 g. methylcellulose, at pH 8.5. The dyeings were strong greenish yellow shades on both gray and bleached hair, which were level and fast to rubbing.

This dye composition was stable when stored at 50° C. for 3 months, since when dyed thereafter it shows the same shade and strength as before storage.

EXAMPLE 10

A dye N-(2-hydroxyethyl)-p-nitroaniline was applied to hair by Procedure A, using 0.15 g. dye, 3.5 g. 1,3-diaminopropane (as alkaline agent), 1.0 sodium lignosulfonate (surfactant), and 3.0 g. hydroxyethylcellulose (thickener) and setting the pH at 8.0. Both gray and bleached hair were dyed equally strong shades of greenish yellow, the dyeings being level and fast to rubbing. The dye bath was stable on 3 months storage at 50° C.

EXAMPLE 11

The dye N-(2-hydroxyethyl)-p-nitroaniline was applied to hair using Procedure B, with 0.2 g. dye, 3.0 g. cetylpyridinium bromide (surfactant), 1.5 g. methylcellulose and tartaric acid added to pH 6.5. The dyeings were strongly greenish yellow shades on gray and bleached hair which were level and fast to rubbing. The dye bath was stable when stored at 50° C. for 3 months.

The same dye was applied by Procedure C on gray and bleached hair in which cases it gave strong level dyeings. The bleached hair dyed slightly stronger than the gray.

EXAMPLE 12

The dye N,N-bis-(2-hydroxyethyl)-p-nitroaniline was applied to hair by Procedure A, using 0.2 g. dye, 1.5 g. ethylenediamine (alkaline agent), 0.75 g. sodium lauryl sulfate (surfactant), and 2.5 g. sodium carboxymethylcellulose, at a pH of 9.5. Strong level greenish-yellow dyeings were obtained on gray, permanent-waved and bleached hair which were fast to rubbing The same dye was applied by Procedure C in which case it gave strong level dyeings of greenish-yellow shades on gray, permanent-waved and bleached hair which was fast to rubbing. The dye bath was stable when stored at 50° C. for 3 months.

EXAMPLE 13

The dye N,N-bis-(2-hydroxyethyl)-p-nitroaniline was dyed by Procedure A, using 0.25 g. dye, 2.0 g. N-phenyl-diethanolamine (alkali), 3.0 g. coconut diethanolamide (surfactant) and 1.0 g. copolymer of acrylic acid and allylsucsose (thickener), the pH being set at 9.0. Strong level dyeings in greenish-yellow shades were obtained on gray, permanent-waved and bleached hair. The dye bath stored at 50° C. for 3 months, gave no change in shade and strength of dyeing thereafter.

EXAMPLE 14

N,N-bis-(2-Hydroxyethyl)-p-nitroaniline was applied by Procedure B using the same quantity of dye, 3.0 g. polyoxyethylated nonylphenol and 3.0 g. methylcellulose, and acetic acid to pH 3.0. Strong level dyeings were obtained in greenish-yellow shades, equal on gray, permanent-waved and bleached hair which were fast to rubbing. When the dye composition was stored for 3 months at 50° C., it gave the same shade and strength after storage as before.

EXAMPLE 15

A 0.25 percent solution of the dye N,N-bis(2-hydroxyethyl)-p-nitroaniline was made acid to pH 4 by the addition of sulfuric acid. Then 5-gram pieces of wool and nylon goods were entered at 140° F. The dye bath was raised to the boil over one-half hour; and held at the boil for 1 hour. The cloth pieces were dyed in greenish-yellow shades of fairly good wash-fastness and fast to working.

What is claimed:

1. An aqueous hair-dyeing composition comprising an aqueous vehicle and containing:
   a. from 0.001 to 5 percent by weight of a hydroxyalkyl nitroaniline dye of the formula:

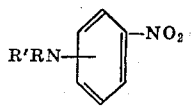

wherein R is hydrogen, $C_1$ to $C_4$ alkyl or $C_1$ to $C_4$ hydroxyalkyl and R' is $C_1$ to $C_4$ hydroxyalkyl;
   b. from 0.01 to 20 percent by weight of surfactant;
   c. from 0.1 to 20 percent by weight of a thickening agent;
   and sufficient acid to give the composition a pH in the range of from about 2.5 to 11.

2. A composition according to claim 1 also including an alkali, said composition having a pH in the range of 7.5 to 9.5.

3. A composition according to claim 1 wherein the pH is in the range of about 3.5 to 6.5.

4. A composition according to claim 1 also including from about 0.005 to 2 percent by weight of an oxidation dye.

5. A composition according to claim 1 containing about 0.001 to 2 percent by weight of N-(2-hydroxyethyl)-o-nitroaniline and having a pH in the range of about 3.5 to 10.

6. A method for dyeing human hair on the head which comprises applying to said hair at a temperature in the range of from about room temperature to about 60° C. an aqueous composition containing a tinctorially effective amount of hydroxyalkyl nitroaniline dye and maintaining said dye in contact with said hair until said hair is dyed; said hydroxyalkyl nitroaniline having the formula:

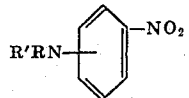

wherein R is hydrogen, $C_1$ to $C_4$ alkyl or $C_1$ to $C_4$ hydroxyalkyl and R' is $C_1$ to $C_4$ hydroxyalkyl.

7. A process according to claim 6 wherein said aqueous composition contains from about 0.001 to 5 percent by weight of said hydroxyalkyl nitroaniline.

8. A process according to claim 6 wherein said composition contains from about 0.001 to 2 percent by weight of the total composition of N-(2-hydroxyethyl)-o-nitroaniline and the composition has a pH in the range of about from 3.5 to 10.

* * * * *